United States Patent [19]

Evans

[11] Patent Number: 4,513,780

[45] Date of Patent: Apr. 30, 1985

[54] SOLENOID VALVE

[75] Inventor: David G. Evans, Rochester, Mich.

[73] Assignee: General Motors Corporation, Detroit, Mich.

[21] Appl. No.: 578,124

[22] Filed: Feb. 8, 1984

[51] Int. Cl.³ .............................................. F15B 13/044
[52] U.S. Cl. ................................ 137/625.65; 137/270; 137/625.64; 137/625.68; 251/139
[58] Field of Search ............. 137/270, 625.64, 625.65, 137/625.68; 91/276; 251/139

[56] References Cited

U.S. PATENT DOCUMENTS 4,286,767 9/1981 Hashimoto .
4,307,752 12/1981 Inada et al. .
4,339,109 7/1982 Kawata et al. .

Primary Examiner—Gerald A. Michalsky
Attorney, Agent, or Firm—Donald F. Scherer

[57] ABSTRACT

A solenoid valve has a housing in which is disposed a coil, a sleeve valve and a plurality of hydraulic fluid passages. The passages are formed in a cylindrical core which is integral with and extends axially from an end wall of the housing. The sleeve valve is slidably mounted on the core and has a pair of annular recesses which are selectively positionable by valve movement to interconnect various combinations of passages for controlling hydraulic fluid flow. The sleeve valve has a metal ring secured thereto so that the sleeve valve will be moved in response to electric current flowing in the coil which surrounds a portion of the sleeve valve.

3 Claims, 2 Drawing Figures

SOLENOID VALVE

This invention relates to solenoid valves and more particularly to solenoid valves incorporating a sleeve valve member.

It is an object of this invention to provide an improved solenoid valve having a slidable sleeve valve member disposed on a stationary cylindrical core, an energizable solenoid coil for moving the sleeve member against a spring whereby annular passages in the inner surface of the sleeve valve will selectively connect a pressure control passage with either an exhaust passage or a pressure passage, all of which passages are formed in the core.

It is another object of this invention to provide an improved solenoid valve wherein a central core having a plurality of passages formed therein is surrounded by a slidable sleeve valve member having a pair of inner annular passages and also wherein the sleeve valve member has a ring of magnetically attractable metal secured thereto whereby the sleeve member is movable by the magnetic attraction of a solenoid coil structure to selectively align the annular passages with selected passages in the central core to control the communication of fluid therebetween.

Figure 1:
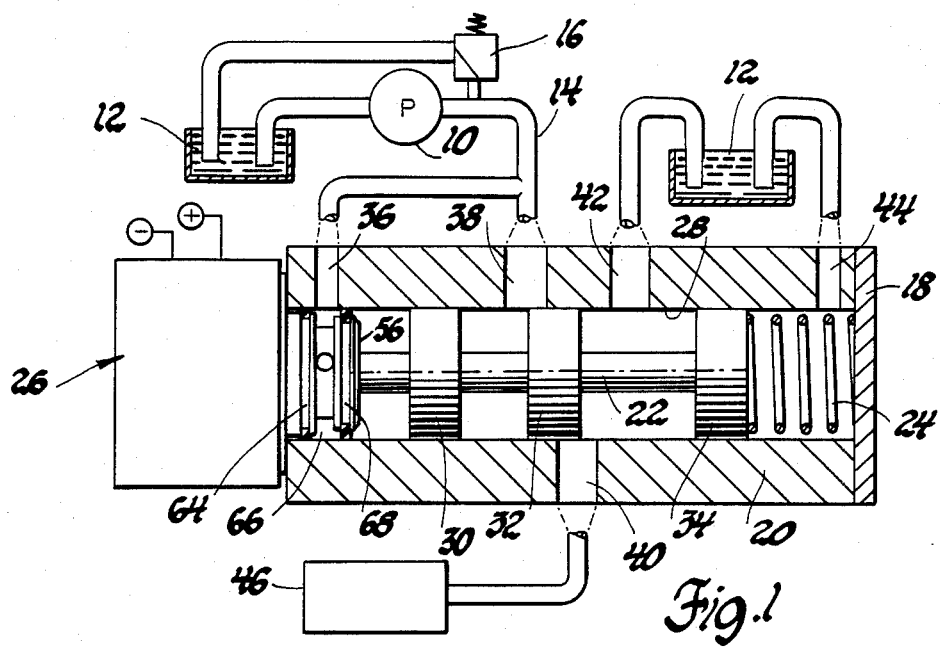
Figure 2:
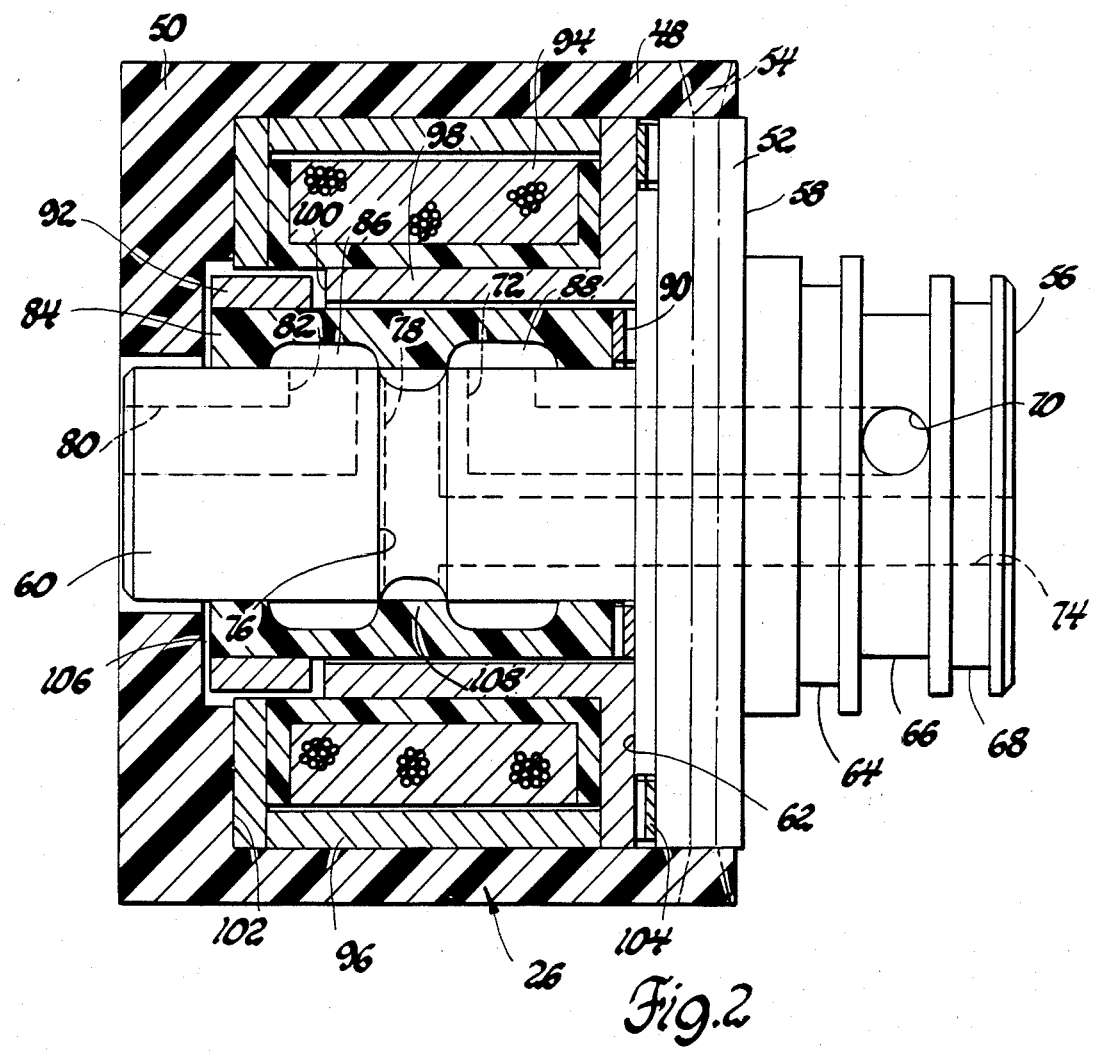

These and other objects and advantages of the present invention will be more apparent from the following specification and drawings in which:

FIG. 1 is a diagrammatic view of a fluid system incorporating the present invention; and FIG. 2 is a sectional elevational view of a solenoid valve incorporating the present invention.

Referring to the drawings, wherein like characters represent the same or corresponding parts throughout the several views, there is seen in FIG. 1 a hydraulic fluid circuit having a conventional pump 10 which draws fluid from a reservoir 12 for delivery to a pressure passage 14. The pressure in passage 14 is established by a conventional regulator valve 16.

The passage 14 is connected to a hydraulic spool valve 18 which includes a housing or valve body 20, a spool 22, a control spring 24 and a solenoid valve 26. The solenoid valve 26 is connected to the positive and negative terminals of a DC source of electrical power, not shown.

The housing 20 has a central bore 28 in which is slidably disposed the spool 22 which is comprised of three valve lands 30, 32 and 34. The valve body 20 has a pair of pressure ports 36 and 38, an outlet port 40 and a pair of exhaust ports 42 and 44. The pressure port 36 is connected to the solenoid valve 26 and the exhaust port 44 is connected to the area of bore 28 containing spring 24.

The spool 22 is moved, to the position shown, by the spring 24 such that port 40 is connected to port 42 whereby the hydraulic system 46 is connected to exhaust or reservoir 12. The valve land 32 in this position prevents communication between port 38 and port 40. The end of spool 22 adjacent valve land 30 is subject to pressure controlled by solenoid 26. When valve land 30 is pressurized, the spool 22 will be moved against spring 24 to thereby disconnect port 40 from port 42 while connecting port 40 with port 38. Upon connection of ports 38 and 40, the system 46 will be pressurized. The above described is a conventional type control system wherein a solenoid valve is used to control the positioning of a valve member. Such a valve is generally termed a pilot-operated three-way valve.

Referring to FIG. 2, there is seen the solenoid valve 26 which is comprised of a two-piece housing member 48. The housing 48 has a cover portion 50 and an end wall portion 52 which are secured together by sonic welding at 54 or any of the other well known means for interconnecting plastic members. The housing 48 is formed of any of the well known plastic compounds. The end wall 52 has a first cylindrical portion 56 extending axially from an end wall 58 and a cylindrical core member 60 extending axially from an end wall 62. The cylindrical portion 56 has formed therein three grooves 64, 66 and 68.

As seen in FIG. 1, grooves 64 and 68 contain O-ring type seal members while groove 66 is disposed in fluid communication with pressure port 36. The groove 66 is also in fluid communication with a pressure passage 70 which extends axially through wall 52 into cylindrical core member 60. The passage 70 has a radial portion 72 which communicates with the outer surface of cylindrical core 60.

The cylindrical portion 56 has an axially extending control passage 74 formed therein, which passage 74 extends from the righthand face of cylindrical portion 56 to an annular groove 76 formed in the cylindrical core 60. The passage 74 is communicated with the outer surface of annular groove 76 by a radial passage 78.

The cylindrical core 60 has formed therein an exhaust passage 80 which includes a radial portion 82 communicating with the outer surface of cylindrical core 60. The cylindrical core 60 has slidably disposed thereon, a sleeve valve 84. The sleeve valve 84 has a pair of internal annular recesses 86 and 88 which are designed to permit selective fluid communication between passage 70 and 74 and between passage 74 and 80, depending upon the axial position of sleeve valve 84 on the cylindrical core 60.

The sleeve valve 84 is urged leftward by a wave spring 90 to provide fluid communication between passage 74 and passage 70. In the present system, such positioning would communicate high pressure fluid from pump 10 to the control chamber adjacent valve land 30 thereby putting valve 18 in the pressure set position.

The sleeve member 84 is made from any of the well known plastic materials and has secured thereto a metal ring 92. The metal ring 92 is ferrous metal and thereforeresponsive to magnetic attraction.

Surrounding the sleeve valve 84 and disposed within the cover 50 of housing 48, is a solenoid coil 94 which has incorporated therewith a magnetizable housing 96. The inner cylindrical portion 98 of housing 96 has an annular end wall 100 which faces the ring 92. When the solenoid coil 94 is supplied with electric current, the housing 96 will be magnetized and will therefore attract ring 92 and urge sleeve valve 84 to move rightward against wave spring 90. When the force of wave spring 90 is overcome, the sleeve valve 84 will disconnect passage 70 from passage 74 while connecting passage 74 to exhaust passage 80. This operation will connect the control chamber of valve 18 to exhaust thereby permitting valve spool 22 to assume the spring set position as shown in FIG. 1.

The solenoid coil 94 and its housing 96 are urged into abutting relationship with an interior annular wall 102 of cover 50 by a wave spring 104. This structure ensures that the components will be secured in position within the housing 48 such that relative movement between the solenoid coil 94 and housing 96 is not permitted.

The sleeve valve 84 is shown in the null position wherein passage 74 is not directly connected to outer passage 70 or 80. When the solenoid coil 94 is de-energized, the spring 90 will move the sleeve valve 84 leftward closing the gap 106 shown at the left end of sleeve valve 84 such that in the spring set position of sleeve valve 84, passages 70 and 74 are interconnected. When the solenoid coil 94 is sufficiently energized, the sleeve valve 84 will move rightward against spring 104 to connect passages 74 and 80.

In some valve structures, it is desirable that the spring set position is operable to connect the fluid control passage, such as 74, to the exhaust passage 80. With the present invention, this is accomplished by simply assembling the sleeve valve 84 and solenoid 94 180° to the position shown, while maintaining the spring 90 at the end of sleeve valve 84 opposite to the metal ring 92. It is obvious that with such structure the spring 90 would urge the valve spool to a position which would interconnect passages 74 and 80 such that the spring set position of the solenoid valve would provide an exhaust connection for the control passage. In such a revised assembly, energization of the solenoid 94 would move the sleeve valve 84 to provide communication between the pressure passage 70 and the control passage 74.

From the above description, it is obvious that a very versatile solenoid control valve has been provided by this invention. It should be further noted that the description provides for an off/on type solenoid operation. By judicious selection of the axial length of land 108 on the sleeve valve 84 between annular recesses 86 and 88, the overlap between these recesses can be controlled. Such a structure would provide simultaneous communication between all three passages 70, 74 and 80. By utilizing a pulse-width-modulated solenoid, the extent of the intercommunication of these three passages can be controlled so that the pressure available in passage 74 is essentially an analog signal rather than a digital signal which would be available. Such analog signals are useful where a pilot-operated pressure control function is desired. Thus, it is seen that an even more flexible and useful solenoid control pressure can be provided with the present invention.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A solenoid valve comprising; a central core member having a cylindrical portion with a supply passage, a control passage and an exhaust passage formed therein and an end wall; a sleeve valve member slidably disposed on said core member having a plurality of annular recesses circumjacent said cylindrical portion and being movable thereon to provide selective communication between said supply passage and said control passage and between said control passage and said exhaust passage and said sleeve valve member also including a magnetically attractable ring member disposed on the outer periphery thereof; the solenoid coil surrounding at least a portion of said sleeve valve member and said central core and including a casing member which is operable to magnetically attract said magnetically attractable ring member when said solenoid coil is energized, spring means for urging separation between said magnetically attractable ring member and said casing member; and housing means including in part said end wall enclosing said coil and said sleeve valve member.

2. A solenoid valve comprising; a central core member having a cylindrical portion with a supply passage, a control passage and an exhaust passage formed therein and an end wall; a sleeve valve member slidably disposed on said core member having a plurality of annular recesses circumjacent said cylindrical portion and being movable thereon to provide selective communication between said supply passage and said control passage and between said control passage and said exhaust passage, and said sleeve valve member also including a steel ring member disposed on the outer periphery thereof; the solenoid coil surrounding at least a portion of said sleeve valve member and said central core and including a casing member which is operable to magnetically attract said steel ring member when said solenoid coil is energized, spring means acting on said sleeve valve member for urging separation between said steel ring member and said casing member; and housing means including in part said end wall enclosing said coil and said sleeve valve member.

3. A solenoid valve comprising; a central core member having a cylindrical portion with a supply passage, a control passage and an exhaust passage formed therein and an end wall; a sleeve valve member slidably disposed on said core member having a plurality of annular recesses circumjacent said cylindrical portion and being movable thereon to provide selective communication between said supply passage and said control passage and between said control passage and said exhaust passage, and said sleeve valve member also including a magnetically attractable ring member disposed on the outer periphery thereof; the soleniod coil surrounding at least a portion of said sleeve valve member and said central core and including a casing member which is operable to magnetically attract said magnetically attractable ring member when said solenoid coil is energized, first spring means acting on said sleeve valve member for urging separation between said magnetically attractable ring member and said casing member; housing means including in part said end wall enclosing said coil and said sleeve valve member, and second spring means acting on said housing means and said casing member for axially positioning said casing member and solenoid coil in said housing means.

* * * * *